May 19, 1936. S. R. HEMPHILL 2,041,065
LOCKING DEVICE
Filed Sept. 14, 1934 2 Sheets-Sheet 1
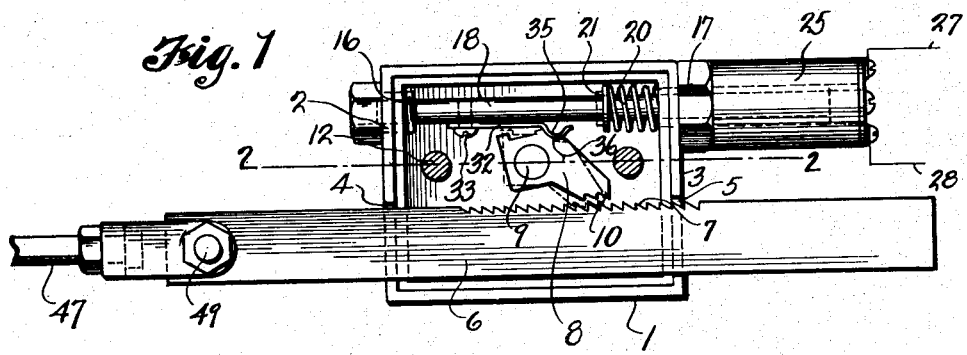
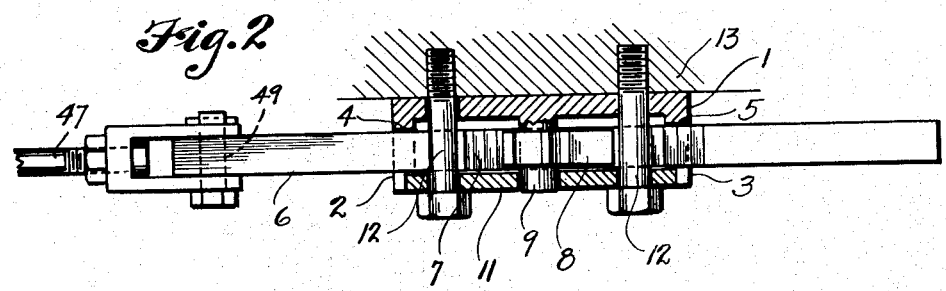
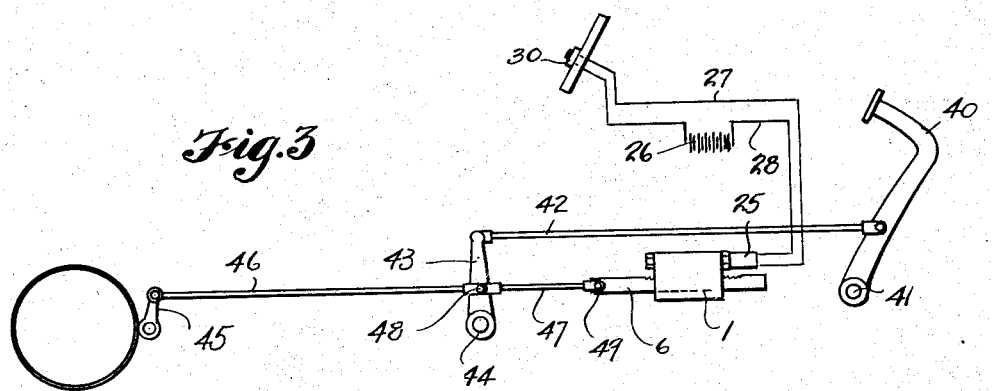
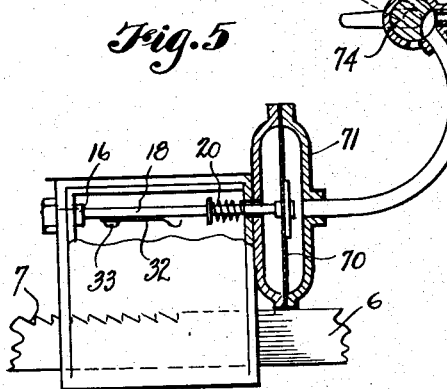
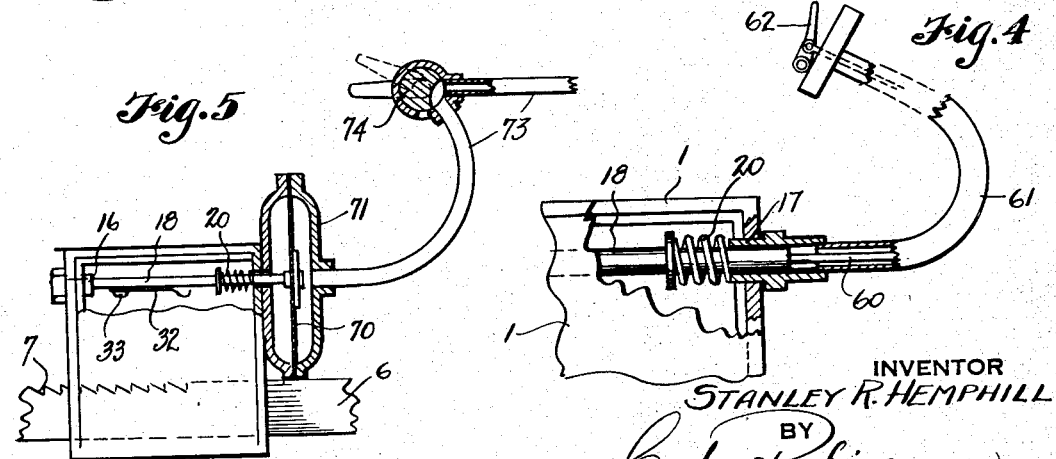
INVENTOR
STANLEY R. HEMPHILL
BY
Cook & Robinson
ATTORNEY May 19, 1936.  S. R. HEMPHILL  2,041,065
LOCKING DEVICE
Filed Sept. 14, 1934  2 Sheets-Sheet 2

INVENTOR
STANLEY R. HEMPHILL
BY
Cook & Robinson
ATTORNEY

Patented May 19, 1936

2,041,065

UNITED STATES PATENT OFFICE 2,041,065

LOCKING DEVICE

Stanley R. Hemphill, Seattle, Wash.

Application September 14, 1934, Serial No. 744,027

9 Claims. (Cl. 188—265)

This invention relates to locking devices, and more particularly, to locking devices adapted to be used in connection with brakes, such as those now generally used on motor driven vehicles including trucks, busses, automobiles, trailers, aircraft, railway rolling stock, and the like. However, it is not intended that the present invention be limited to use in motor vehicles since it may be readily adapted, without departing from the spirit of the invention, to many other mechanisms wherein it is desirable that certain parts be temporarily locked against movement.

It is the principal object of the present invention to provide relatively inexpensive means, of a simplified and easily operable character, whereby the brakes of an automobile, truck, car, or other propelled vehicle, may be effectively locked in applied position. Furthermore, a device which may be set for automatically releasing the brakes from locked condition incident to a momentary manual or mechanical application of an increased braking pressure.

Explanatory to the present invention it will here be stated that substantially all present day motor vehicles, such as trucks, busses, automobiles and trailers, are equipped with brakes that are manually applied, controlled and released. Some brakes employ a hydraulic pressure medium; others are pneumatically actuated and still others are electrically applied. The most common equipment of automobiles and trucks provides for setting the brakes by manual application of pressure against a foot pedal, identified as the service brake pedal. Associated with the foot pedal is a hand lever used as an emergency braking means and which is equipped with devices for locking it in set position, and which devices must be manually released in order to permit of the unsetting of the brakes.

In the use of the common types of air brakes and hydraulic brakes, braking is effected by a controlled application of the fluid braking medium employed to a cylinder to move a piston, or the like, therein which has operative connection with the braking mechanism of the vehicle.

While the braking systems of the types above explained are satisfactory to a certain extent, there are disadvantages and objectionable features inherent in their particular construction or adaptation. For example, in the usual automobile that is equipped with the service brake pedal and the emergency brake lever, the operator must necessarily release his hold on the steering wheel with one hand to release the emergency brake and, in the event that he has stopped on an incline and has set the emergency brake, it requires more than ordinary skill in getting under way without permitting the vehicle to run back. Not only is the emergency lever an objectionable feature from the operating standpoint but is also objectionable as it consumes space in the vehicle that could otherwise be put to good use. This lever, in its most common location, is a hindrance to the comfort of the driver or extra passenger who might desire to occupy the seat adjacent the driver.

The principal disadvantage or objectionable feature to hydraulic and pneumatic brakes resides in the fact that the fluid pressure medium employed will frequently leak past the piston or diaphragm with which the braking equipment is connected, or will become exhausted, for any one of various other reasons, while the brakes are applied, and thereby render the brakes ineffective. This is especially true in the event of a supply conduit breaking, or of continued application on long grades under heavy braking pressure.

In view of the above mentioned and other disadvantages inherent in brakes and braking systems, as now generally employed, it has been the principal object of this invention to provide means whereby the brakes, when applied in the usual manner, may be positively locked and held in set position and which, in the common automobile, or truck type of vehicles, eliminates the hand operated emergency brake lever, and employs only the service brake pedal both for setting the brakes and for releasing them.

More specifically stated, the present invention resides in the provision of a locking device as above stated, including a ratchet bar operatively connected for movement with the braking mechanism, a pawl adapted to be set in position either before or during a braking operation, to engage the ratchet bar to retain any amount of braking pressure applied to the brakes, and a release device which may be manually, electrically or pneumatically set in position to effect the unlocking of the brakes automatically incident to an added application of braking pressure to the brakes.

Other objects of the invention reside in the details of construction and combination of parts and mode of operation, as will hereinafter be fully described.

In accomplishing these objects, I have provided the improved details of construction, the preferred forms of which are illustrated in the accompanying drawings, wherein—

Fig. 1 is a face view of a locking mechanism embodied by the present invention; the housing cover plate being removed for better illustration.

Fig. 2 is a sectional view of the device as viewed in the horizontal plane of line 2—2 in Fig. 1.

Fig. 3 is a view diagrammatically illustrating a typical installation of the device in connection with the service brake system of an automobile.

Fig. 4 is a detail of a means for manual control suitable for automobile use.

Fig. 5 is a detail of means for pneumatic control of the locking device.

Figure 6:
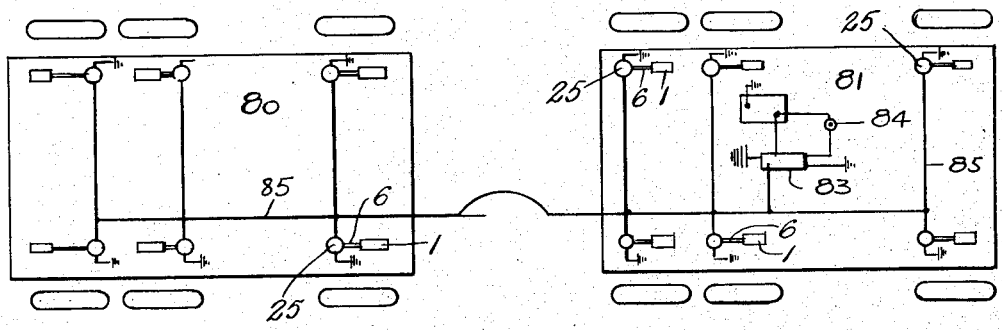
Fig. 6 is a diagrammatic illustration of locking devices as applied to a truck and trailer.

Referring more in detail to the drawings—

First, describing the locking device in its most common form with the understanding, however, that it may be altered in size and shape as well as on the proportion of its parts in accordance with requirements of any particular installation. The device comprises a housing 1 of rectangular form with opposite side walls 2 and 3 provided, respectively, with alined openings 4 and 5 through which a ratchet bar 6 is extended. This bar is slidable lengthwise in the housing and along one edge it is provided with ratchet teeth 7. A pawl 8 is pivotally mounted within the housing on a pivot stud 9 and this pawl is provided at its end with a plurality of teeth 10 adapted to interlock with the teeth 7 of the bar 6 to hold the latter against movement in one direction.

A cover plate 11 is fitted over the housing 1 and is held in place by one or more bolts 12 that are extended therethrough and also through the base of the housing to anchor the device firmly to a support 13 which may be any suitable part of the vehicle such as a frame member or the transmission housing. The cover plate, incidentally in the present showing, holds the bar 6 in place.

Overlying the bar 6, parallel therewith and slidably supported at its ends in guide bearings 16 and 17 that are mounted in the end walls of the housing, is a lock setting and releasing rod 18. This rod is urged toward release position by a coiled spring 20 which surrounds it and which bears against the housing wall 3 and against a collar 21 fixed on the rod. The rod may be pulled in the opposite direction to set the lock, mechanically, electrically, or manually, dependent upon the particular installation, as will presently be described.

In the device of Figs. 1 and 3 shifting of the release rod 18 is effected by energization of a solenoid 25 that is attached to the housing 1. The end of the rod 18 extends into the tubular core of the solenoid and when the latter is energized it pulls the rod outwardly against the opposing pressure of the spring 20. The solenoid, in the installation, as shown in Fig. 3, is connected electrically with a source of current 26 by wires 27 and 28 and a push button switch 30 is interposed in wire 28 for closing the circuit.

Extended along the under side of the release rod 18 is a leaf spring 32. This is attached to the rod at one end by a screw, or rivet, 33. The other end of the spring is free and is provided with a downwardly rounded head 35 adapted to engage the pawl 8 in such manner that when the rod 18 is in release position, the pawl is tilted upwardly and its teeth are disengaged from the rack bar. When the rod 18 is pulled outwardly by the solenoid, the spring 32 pushes the pawl downwardly and causes it to lock against the ratchet bar. A seat 36 is provided in the top edge of the pawl to receive the head 35 to positively lift the pawl free of the bar when the rod 18 is moved by spring 20 to "release" position.

In that type of installation shown in Fig. 3, which is typical for automobiles, the service brake pedal 40 is pivotally mounted at 41 and is connected by a link 42 with a lever arm 43 on a cross shaft 44. The brake arm 45 is operatively connected by a link 46 with the rocker arm 43. Also, a rigid link 47 is pivotally attached to the rocker arm, at 48, and at its other end is pivotally connected, at 49, with the end of the ratchet bar 6.

With the above described connection, pressure on the service brake pedal 40 operates to set the brake of the vehicle and at the same time to shift the ratchet bar 6 inwardly, or toward the right hand side, as seen in Fig. 3. Normally there is no locking of the brake by reason of the fact the pawl 8 is normally held clear of the rack bar by spring 32, but in the event that it is desired to set and lock the brake, the operator, after applying pressure to the service brake pedal 40 and before it is released, closes the solenoid circuit by pressure of the button 30. This causes the pawl setting bar 18 to be pulled forwardly and the pawl to be urged by spring 32 against the rack. Then, when pressure on the service brake is released, the brake will be held set by locking the pawl with teeth of the ratchet bar 6.

After the pawl 8 has thus been locked with the ratchet bar, the solenoid circuit is opened by removal of pressure from the switch button 30, the solenoid is de-energized and the pawl setting bar 18 is then shifted back by spring 20 to "release" position, but the pawl 8 retains its locking hold on the ratchet bar by reason of the frictional engagement of the teeth of the ratchet bar and pawl.

In order to release the brake, it is only necessary to apply an added braking pressure to the service brake pedal sufficient to slightly shift the ratchet bar forwardly thus to free the pawl which, by reason of pressure of the leaf spring 32 against it, will lift clear of the ratchet thus to free the brake.

In an alternative construction as shown in Fig. 4, the pawl setting rod 18 is manually moved to locking position by means of a cable or wire 60 which extends thereto through a flexible tube 61. The wire connects, at a convenient point preferably at the dash or instrument board of the vehicle, with a lever 62 whereby it may be pulled outwardly thus to shift the rod. On release of lever 62, the spring 20 shifts the rod to "release" position.

Figure 8:
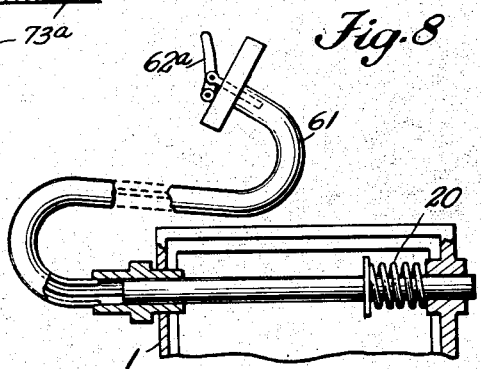
Fig. 8 is an illustration of a modification of the manually controlled means shown in Fig. 4.

In another installation, shown in Fig. 8, the wire might with equal success, be attached to the opposite end of the bar 18 and pushed inwardly by suitable means to move the bar 18 to pawl setting position.

Figure 9:
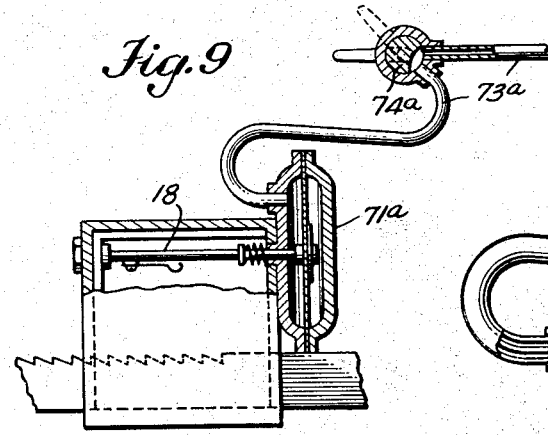
Fig. 9 is an illustration of a modification of the pneumatically controlled means shown in Fig. 5.

In the arrangement of Fig. 5, the rod 18 connects with a flexible diaphragm 70 in a closed, pressure housing 71. A source of vacuum is connected by a conduit 73 with the chamber and a control valve 74 is interposed in the connection. When the valve is opened, the diaphragm is bowed outwardly, thereby to pull the rod 18 to a position for setting the pawl against the ratchet bar. The same results as here stated are possible by use of compressed air, by applying the air to the chamber at the opposite end of the diaphragm from that on which vacuum is applied as illustrated in Fig. 9.

In Fig. 6 is diagrammatically illustrated a typical installation of locking devices for trucks and trailers, wherein 80 and 81 designate respectively the truck and trailer. On the truck is an electrically actuated master switch 83 controlled by a switch button 84. Closing of the switch 84 causes the closing of a circuit through the master switch mechanism thereby to close the master switch. For each of the various wheels of the truck and trailer is a brake locking means like that of Fig. 1, wherein the ratchet bar 6 preferably is directly connected with the brake arm. Each locking device has its controlling solenoid connected in a circuit connection 85 leading to one side of the master switch. The other side of each solenoid is grounded to the master switch so that when the master switch is closed, all solenoids are energized. This use of the locking devices may be in connection with any type of brakes, either air, hydraulic or electric. Also, they are automatically released by an application of braking pressure, as in the use of the device of Fig. 3.

Figure 7:
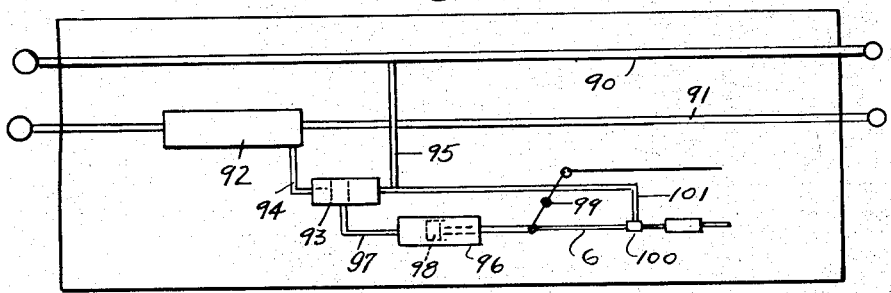
Fig. 7 is a similar illustration of the invention as applied to a railway car in connection with an air brake system.

In Fig. 7 is diagrammatically illustrated a typical installation in connection with air brakes as used on railway cars. In the illustration 90 and 91 respectively, designate air pressure lines from the source of air; the latter pipe supplying a tank 92. 93 designates an air valve connected at opposite sides by pipes 94 and 95 with the lines 90 and 91. An air cylinder 96 is supplied by pipe 97 from valve 93, and a piston 98 in cylinder 96 is moved in accordance with the air pressure. Piston 98 is connected by suitable linkage 99 to actuate the wheel brakes, and connected with link 99 is the ratchet bar 6 of a locking device like that of Fig. 5 wherein air pressure is admitted to a diaphragm chamber 100 through a pipe 101 connected to pipe 94. In the use of this device air in line 94 normally holds the locking device free but in the event that pressure in line 94 is reduced, either by leakage, use or by control valve manipulation, to a certain extent, then the lock is actuated to lock and hold the brake set. Restoration of pressure in line 94 releases the lock automatically.

The present lock is useful in many other applications not specifically mentioned, for instance, as a throttle lock for motor boats.

Having thus described my invention, what I claim as new therein, and desire to secure by Letters-Patent, is:

1. In a braking system, the combination with a brake setting means of a brake lock including a ratchet bar operatively connected for movement with the brake setting means, a pawl pivotally mounted in position to engage the ratchet bar, to prevent brake releasing movement thereof, and a spring member engaging the pawl and having a support movable to a position for causing the spring to urge the pawl against the ratchet bar, and to another position whereby it effects a positive connection with the pawl to lift it free of the ratchet bar.

2. In a vehicle having wheel brakes and a brake applying lever arm, a brake lock comprising a housing fixed to a part of the vehicle, a ratchet bar slidable therein, means operatively connecting said bar with said lever arm whereby said bar moves with the latter, a pawl pivotally mounted in said housing to engage the ratchet, a slide bar in the housing, a leaf spring on the bar bearing against the pawl and means for shifting the slide bar to different positions whereby, in one position, the pawl is urged by the spring against the ratchet and in another position it is lifted away from it; said pawl being lifted from the ratchet by said spring to release the brake incident to relief of holding tension on the ratchet bar.

3. In a braking system, the combination with movable brake setting means, of a brake lock including a supporting housing, a ratchet bar slidable therein, a link connecting said bar for movement with said brake setting means and through which bar and link said brakes may be held when applied, a pawl pivotally mounted on the housing to engage the ratchet bar to hold it against release movement after the brakes have been applied, a solenoid, a core bar slidable therein, and means on the core bar engaging the pawl to move it from and against the ratchet, a circuit for the solenoid and a control switch for the circuit.

4. In an automobile having a braking system including a brake applying lever and service brake means, a brake lock including a ratchet bar operatively connected for movement with the lever, a pawl mounted to engage the ratchet bar to hold the lever against brake releasing movement, and a pawl setting means connected with the pawl and movable under manual control to "set" position for urging the pawl against the ratchet bar, resilient means for automatically returning the setting means to "released" position; said pawl being designed to be retained in locking contact with the bar through pressure of the latter thereagainst, and releasable by an advance movement of the ratchet bar effected by an additional application of braking pressure through the service brake means, and the movement of the pawl setting means to "released" position that is incident thereto.

5. In a braking system, the combination with a brake setting means of a brake lock including a ratchet bar operatively connected for movement with the brake setting means, a pawl pivotally mounted in position to engage the ratchet bar, to prevent brake releasing movement thereof, a shift rod movable between "set" and "off" positions, a yieldable member on the shift rod engaging the pawl in "set" position of the shift rod, to urge it against the ratchet bar, and operable in the other position of the shift rod to hold it from the bar, a cable operatively connected with the shift rod for moving it manually to "set" position, and a spring for actuating it back to released position.

6. In a braking system, the combination with a brake setting means of a brake lock including a ratchet bar operatively connected for movement with the brake setting means, a pawl pivotally mounted in position to engage the ratchet bar, to prevent brake releasing movement thereof, a shift rod, and means on the shift rod engaging the pawl at one position of the rod for urging the pawl against the ratchet bar, and in another position of the rod, to lift the pawl from the ratchet, and a pneumatic means manually controlled to effect movement of the shift rod.

7. In a braking system, the combination with a brake setting means, of a brake lock comprising a ratchet bar operatively connected for longitudinal movement with movement of the said brake setting means, a pivoted pawl for engaging said ratchet bar to prevent brake releasing movement, and a pawl setting means comprising a shift rod movable between "released" and "set" positions, a spring means on the rod engaging the pawl and operable, when the rod is in "set" position, to urge the pawl into locked relation with the ratchet bar and adapted to provide a positive connection between the rod and pawl for releasing the latter; said pawl being adapted to be retained locked with the ratchet bar through the braking pressure applied, and a spring arranged to be placed under compression by movement of the shift rod to "set" position, and adapted to move it back to "released" position incident to release of the pawl from the ratchet bar by an additional application of braking pressure through the brake setting means.

8. In a braking system, the combination with a brake setting means, of a brake lock including a ratchet bar operatively connected for movement with the brake setting means between "set" and "released" positions, and through which bar an application of brakes may be sustained, a pivoted pawl positioned for engaging said ratchet bar to prevent a brake releasing movement thereof, a shift rod, means on the rod for effecting an operative connection with the pawl to move it into and from holding contact with the ratchet bar incident to movement of the shift rod to "set" and "released" positions, a solenoid adapted to be energized to move the shift rod to "set" position, and a spring adapted to be placed under compression by said movement for urging the shift rod to released position incident to de-energization of the solenoid and the relief of braking pressure on the pawl effected through the brake setting means.

9. In a braking system, the combination with a member movable in accordance with movement of a brake setting means, of a brake lock comprising a ratchet bar that is fixed to move with the said member, and through which bar application of braking pressure may be sustained, a movably fixed pawl adapted to engage the ratchet bar to prevent brake releasing movement thereof, pneumatically operable means operatively connected with the pawl and normally yieldably urging it to position disengaged from the ratchet, a source of pneumatic energy, and means for effecting an application of this energy to the pneumatic means to actuate the pawl into holding relation with the ratchet.

STANLEY R. HEMPHILL.